Jan. 1, 1924
J. F. CULLIN
ARMATURE COIL WINDER
Filed Sept. 2, 1920
1,479,285
2 Sheets-Sheet 1
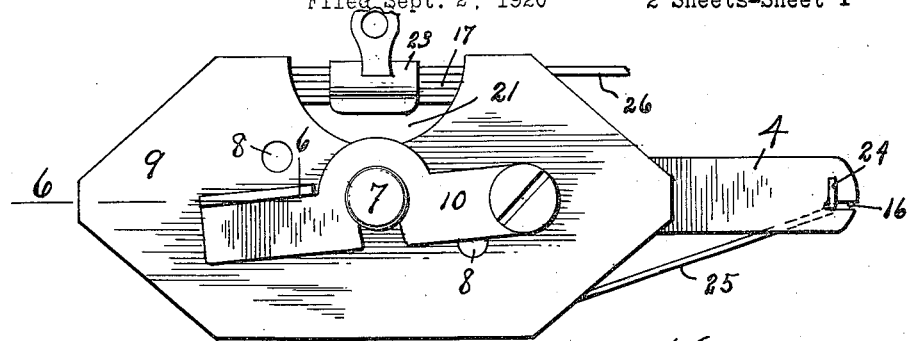
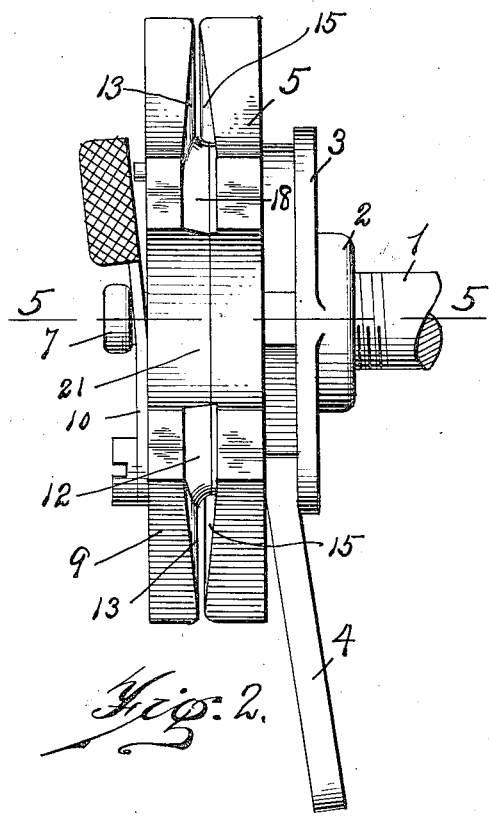
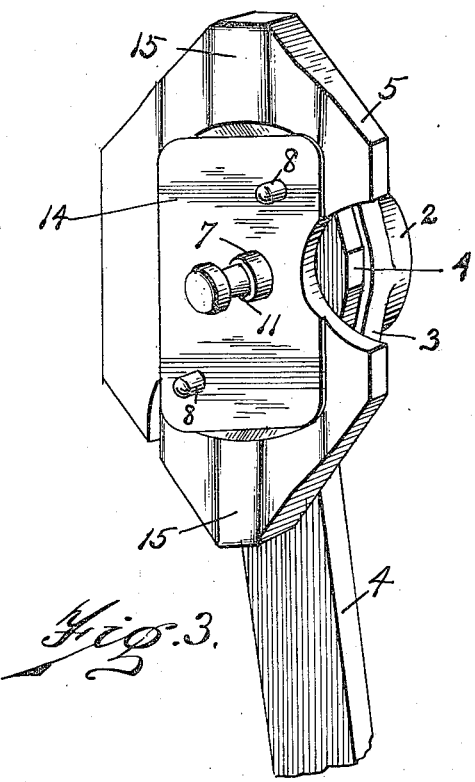
WITNESSES:
INVENTOR
Jasper F. Cullin
BY
Edward N. Pagelsen.
ATTORNEY Jan. 1, 1924

J. F. CULLIN

ARMATURE COIL WINDER

Filed Sept. 2, 1920

1,479,285

2 Sheets-Sheet 2

WITNESSES:
A. J. Stenner

INVENTOR.
Jasper F. Cullin
BY
Edward N. Pagelsen
ATTORNEY.

Patented Jan. 1, 1924.

1,479,285

UNITED STATES PATENT OFFICE.

JASPER F. CULLIN, OF DETROIT, MICHIGAN, ASSIGNOR TO WILLIAM J. HARTWIG, OF DETROIT, MICHIGAN.

ARMATURE-COIL WINDER.

Application filed September 2, 1920. Serial No. 407,708.

*To all whom it may concern:*

Be it known that I, JASPER F. CULLIN, a citizen of the United States, and residing at Detroit, in the county of Wayne and State of Michigan, have invented a new and Improved Armature-Coil Winder, of which the following is a specification.

This invention consists of a form upon which wire coils for the armatures of electric machines can be accurately wound with those portions which are to fit into the slots in the armature cores at those angles to each other which they assume when in such slots, which form is made up of two detachable parts, one of which is provided with a central rectangular hub with beveled edges of substantially the form it is desired to impart to the finished coils.

This invention also consists in the details of construction illustrated in the accompanying drawings and particularly pointed out in the claims.

Figure 4:
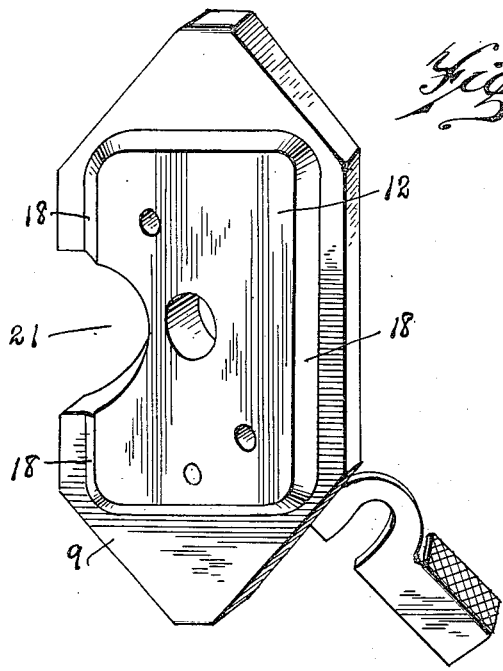
Figure 6:
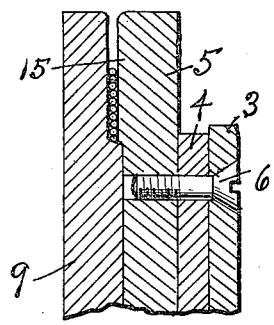
Figure 5:
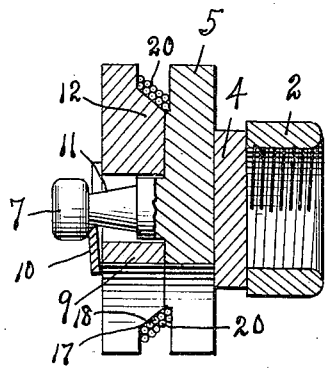
Figure 7:
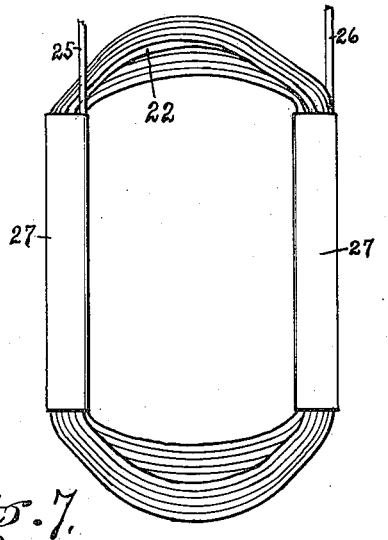

In the accompanying drawing, Fig. 1 is an elevation and Fig. 2 is a plan of this winder for armature coils. Fig. 3 is a perspective of one of its parts, and Fig. 4 of the other. Fig. 5 is a section on the line 5—5 of Fig. 2. Fig. 6 is a section on the line 6—6 of Fig. 1, the latch being omitted. Fig. 7 is a plan of a finished coil.

Similar reference characters refer to like parts throughout the several views.

Armature windings or coils should be given the exact form which they will have when mounted in the slots in the armature core. The two slots which receive the parallel portions of a coil are often about ninety degrees apart, and coils for such armatures should be so wound that the angle between the parallel portions of the coils is of that degree. It will be understood that the present coil winder may be modified to cause these parallel portions of the coils to be at any other desired angle to each other.

In Fig. 2 I have shown the end of an arbor 1 of a well known winding machine which need not be explained farther except to point out that this arbor makes a predetermined number of rotations and then stops. Ten rotations are required to wind the coils shown in the accompanying drawings. A hub 2 and a disk 3 have attached to them the wire holding arm 4 and the plate 5 by means of screws 6. This hub is adapted to screw onto the arbor 1.

This plate 5 has a central pin 7 and two dowel-pins 8 to position the follower plate 9 which may be locked in position by the latch 10 which fits into a circumferential groove 11 in the pin 7. This follower has a rectangular hub 12 and oppositely extending radial ribs 13, the edges of the hub being beveled, as indicated in Fig. 5. The plate 5 has a convex central portion 15 which extends radially opposite the ribs 13 on the follower.

When a coil is to be wound, the end of the wire is placed in the slot 16 in the arm 4 and the winder arbor rotated. The first inclined row 17 of windings will be wound on the inclined side edges 18 of the hub 12 of the follower, the ribs 13 and 15 compelling these windings to lie in a single plane between them, as shown in Fig. 6. After the five windings 17 are on the hub the next five windings 20 are formed. The crossing from the top winding 17 to the bottom winding 20 is by means of the strand 22 shown in Fig. 7 and this crossing strand lies in the same plane as the others at the end of the coil. After the desired number of windings have been positioned, the arbor stops and a clamp 23 is placed on the coil, as shown in Fig. 1, the plate 5 and the follower 9 having the notches 21 to permit this. The end 24 is now released from the notch 16 and the latch 10 swung to permit the removal of the follower plate, which permits the coil to be removed from the hub 12. It will be noticed that one end 25 of the coil is at the bottom of one side and the end 26 at the top of the other side, which is of great importance in securing the ends to the commutator bars.

After the coil has been removed from the winder, strips of paper 27 are wrapped around the side portions of the coil to hold the windings in position, and these wrappers remain on the coil after it has been positioned on the armature core. When dipped, these wrappers absorb varnish and cement the coils in their grooves and also constitute good insulating material.

The angles of the sides of the hub 12, the number of layers of the coils, the means for securing the follower to the plate 5 and the various other details may be changed to meet the requirements of the various electric machines by those skilled in the art without departing from the spirit of my invention as set forth in the following claims.

I claim :—

1. A winder for the coils of armatures for electric machines consisting of two members and means to secure them together, one of the members having a hub with inclined edges, said securing means comprising a pin on one of the members provided with a circumferential groove and a latch pivoted on the other member and adapted to engage in the groove in the pin.

2. A winder for armature coils comprising a pair of members and means to secure them together, one of said members having a rectangular hub with two parallel beveled edges and having flanges extending from said hub, the other of said members being formed with opposed radial ribs extending in opposite directions parallel to the beveled edges of the hub.

3. A winder for armature coils comprising a pair of members and means to secure them together, one of said members having a rectangular hub with two parallel beveled edges, one of said members being formed with opposed radial ribs extending in opposite directions parallel to the beveled edges of the hub, the two members being spaced apart at said ribs to admit a single thickness of the coil wire, said members being formed with registering notches extending down into the hub to expose the coil which is wound thereon.

JASPER F. CULLIN.